US008033696B2

(12) United States Patent
Simon

(10) Patent No.: US 8,033,696 B2
(45) Date of Patent: Oct. 11, 2011

(54) HEAT SINKS AND OTHER THERMAL MANAGEMENT FOR SOLID STATE DEVICES AND MODULAR SOLID STATE SYSTEMS

(76) Inventor: Jerome H. Simon, Newton, MA (US)

(*) Notice: Subject to any disclaimer, the term of this patent is extended or adjusted under 35 U.S.C. 154(b) by 532 days.

(21) Appl. No.: 12/148,274

(22) Filed: Apr. 17, 2008

(65) Prior Publication Data

US 2008/0285272 A1 Nov. 20, 2008

Related U.S. Application Data

(60) Provisional application No. 60/925,335, filed on Apr. 19, 2007.

(51) Int. Cl.
*B60Q 1/06* (2006.01)

(52) U.S. Cl. ........................................ 362/373; 362/294

(58) Field of Classification Search .................. 362/373, 362/235, 294
See application file for complete search history.

(56) References Cited

U.S. PATENT DOCUMENTS

| | | | | |
|---|---|---|---|---|
| 5,857,767 | A * | 1/1999 | Hochstein | 362/294 |
| 7,083,304 | B2 * | 8/2006 | Rhoads et al. | 362/293 |
| 7,556,406 | B2 * | 7/2009 | Petroski et al. | 362/294 |
| 7,597,453 | B2 | 10/2009 | Simon | |
| 2006/0044814 | A1 * | 3/2006 | Ikeda | 362/382 |
| 2006/0098441 | A1 * | 5/2006 | Chou | 362/294 |
| 2006/0291201 | A1 * | 12/2006 | Smith | 362/227 |
| 2007/0041220 | A1 * | 2/2007 | Lynch | 362/646 |

* cited by examiner

*Primary Examiner* — Evan Dzierzynski
(74) *Attorney, Agent, or Firm* — Burns & Levinson, LLP; Harvey Kaye; David Gomes

(57) ABSTRACT

A luminaire module comprising an LED on an optical axis, thermally mounted to a heat sink, said heat sink comprising openings for which air can circulate; said opening of each portion offset from each other so that light emanating from said LED can pass through the holes from one said portion, said light blocked by the solid area of the other portion.

4 Claims, 8 Drawing Sheets

HEAT SINKS AND OTHER THERMAL MANAGEMENT FOR SOLID STATE DEVICES AND MODULAR SOLID STATE SYSTEMS

REFERENCE TO RELATED APPLICATIONS

The present application is based on and claims the priority of provisional application Ser. No. 60/925,335 filed Apr. 19, 2007. The substance of that application is hereby incorporated herein by reference.

FIELD OF INVENTION

This invention relates generally to lighting devices, and, more particularly to lighting devices with thermal management systems.

SUMMARY OF THE INVENTION

The present invention provides at least 2 LED modules sharing the same optical axis, with each module including at least one LED, each mounted to a heat sink. Each module is electrically connected via conductors to a power source. Each module is disposed within a housing constructed of a material allowing for light from the LED to pass through. The heat sink and housing are fabricated together in a manner as to allow convection around the heat sinks.

The present invention provides a lighting device, such as a luminaire, which has an LED on an optical axis, the LED being thermally mounted to a heat sink. The heat sink has openings for which air can circulate, and the opening of each portion is offset from each other so that light emanating from the LED can pass through the holes from one portion, and light is blocked by the solid area of the other portion.

BRIEF DESCRIPTION OF THE DRAWINGS

These and other objects, features and advantages will be apparent from the following detailed description of preferred embodiments taken in conjunction with the accompanying drawings in which.

DETAILED DESCRIPTION OF PREFERRED EMBODIMENTS

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

Figure 1:
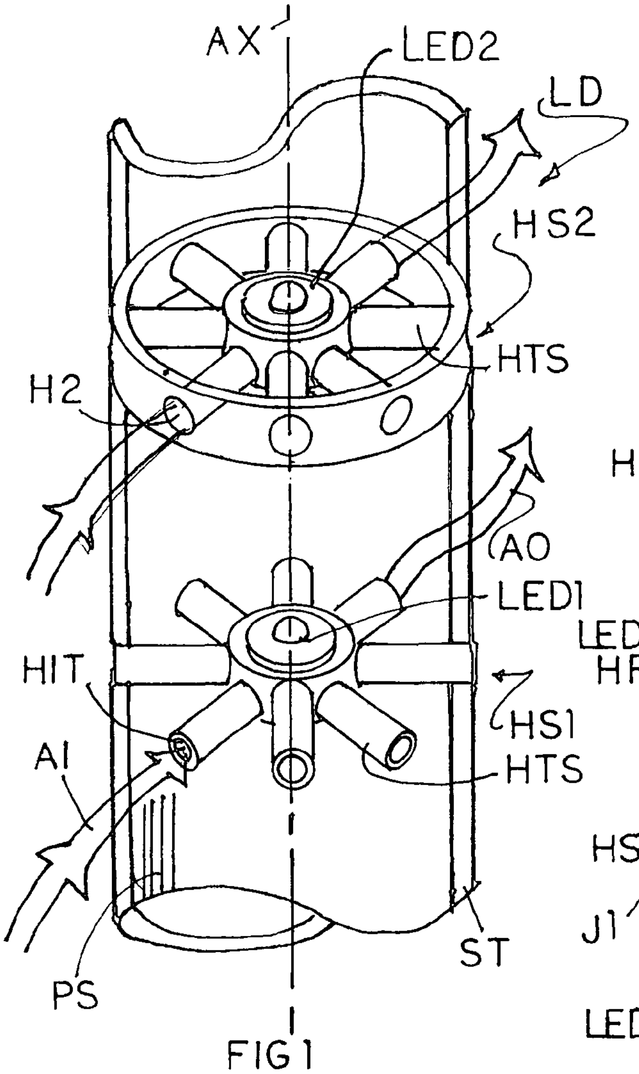
FIG. 1 is an isometric diagram of a partial view of a lighting device.

FIG. 1 is an isometric diagram of a partial view of a lighting device LD comprised of: a housing ST which can be structural and is at least partially transparent (or translucent) or at least has a prismatic surface PS; and two heat components HS1 and HS2 which are at least partially surrounded by ST; and two LEDs substantially sharing the same optical axis AX, LED1 and LED2 which are mounted to HS1 and HS2 respectively. HS1, composed of a material suited to dissipate heat such as aluminum, is comprised of typical tubes HTS which, in conjunction with typical holes HIT (that pierce ST), forming a convection passage for air A1 to enter, flow through, and exit ST as exiting air flow AO. As A1 flows through HS1, heat created by LED is absorbed by HS1 and exits ST as AO, therefore cooling HS1 and LED1.

HS2: The heat dissipation function of HS2 is substantially similar to that of HS1, although HS2 further comprises a ring HR that at least partially surrounds and circumscribes tubes having holes H2 that substantially align with the inside diameter of the tubes. HR can be made to either fit within the inside diameter of ST or be substantially the same as the outside diameter of ST, in which case ST can be fabricated in sections which can be combined with HS2 components to form modules. This modular design is further described in FIG. 1A. LED1 and LED2 can be further comprised of lenses and or reflectors as in my U.S. Pat. No. 5,897,201 incorporated herein, and HS1 or HS2 can be comprised of lenses or refractive and reflective surfaces as in FIGS. 4, 4A, 4B, 4C, and 4D.

Figure 1A:
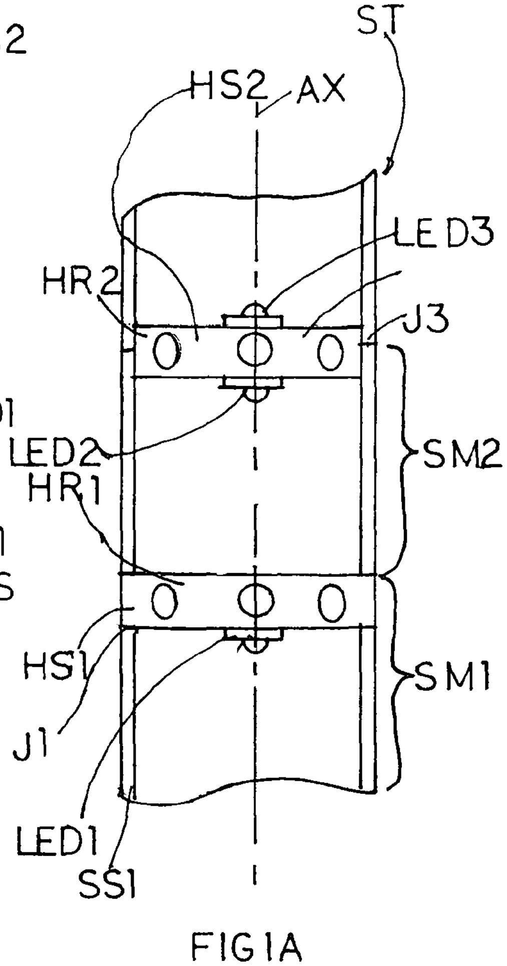
FIG. 1A is a side view diagram of a lighting device similar in function to that shown in FIG. 1.

FIG. 1A is a side view diagram of a lighting device LD having similar heat dissipation characteristics as the LD of FIG. 1, differing in structure in that HR1 and HR2 are both comprised of rings, HR1 and HR2 respectively. HR1 is substantially concentric and equal diameter to ST and is joined to a section of ST, SS1, as junction j1 to form a module SM1 that further comprises LED1. Module SM2 is comprised of HS2 (of which HR2 is of a diameter that fits within the ID of ST), a section of ST, SS2 and LED2.

Figure 2:
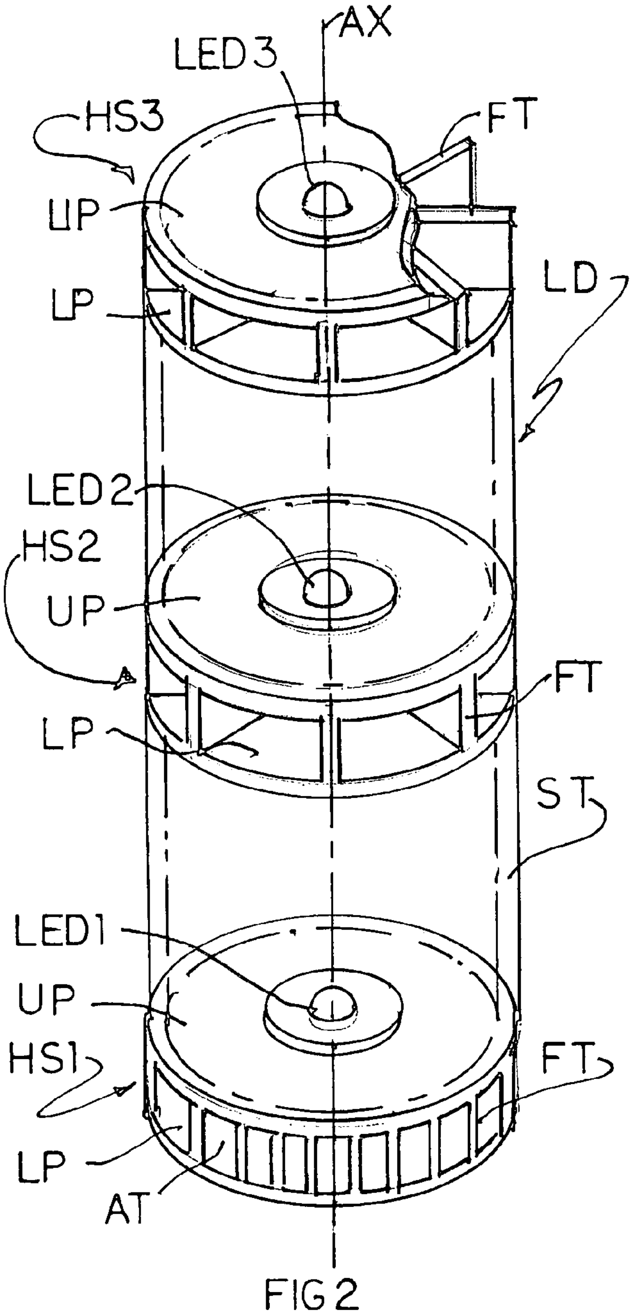
FIG. 2 is an isometric diagram of a partial view of a luminaire similar in function to that shown in FIG. 1.
Figure 2A:
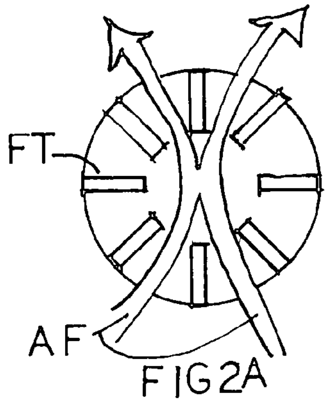
FIG. 2A is a plan view of a heat sink component as shown in FIG. 1.
Figure 2B:
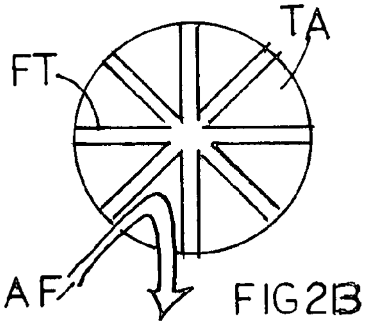
FIG. 2B is a plan view of heat sink component as shown in FIG. 2.
Figure 2C:
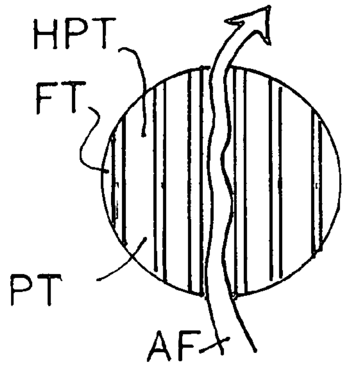
FIG. 2C is a plan view of a heat sink component as shown in FIG. 2.

HR2 is shown to have an LED2 on its lower side and an LED3 on its upper side illustrating that the heat sinks of FIG. 1 through FIG. 2C can have one or more LEDs on one or both of its sides.

Figure 3:
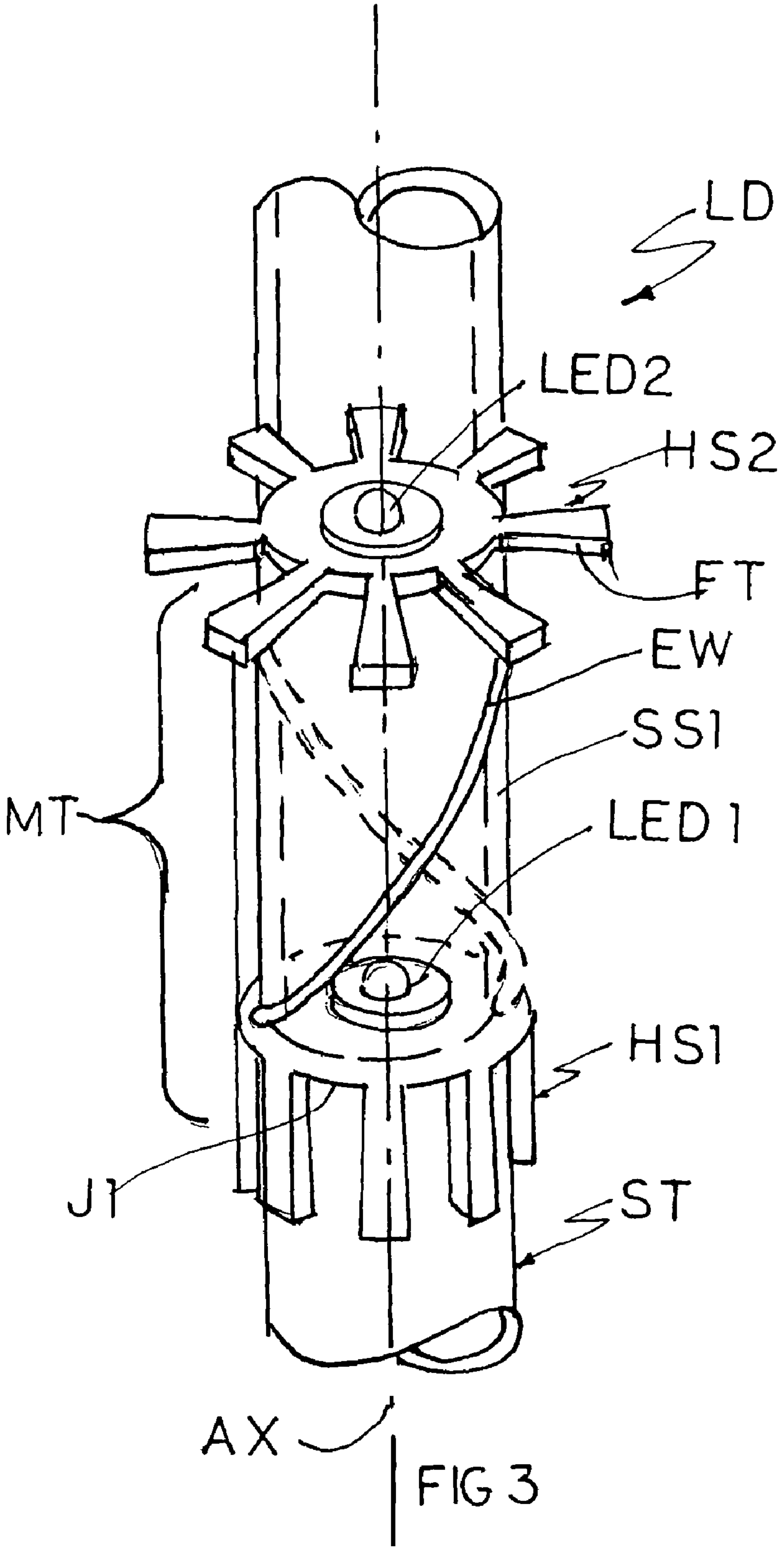
FIG. 3 is an isometric diagram of a lighting device with a portion of the heat sink located outside of the device.

An electrical connection between LED1 and LED2 is further described in FIG. 3.

FIG. 2 is an isometric diagram of a partial view of a lighting device LD, similar in function to the LD illustrated in FIG. 1 differing in that the heat sinks HS1, HS2, HS3 are comprised of air flow pathways formed by plates and fins that are organized in a substantially geometric three dimension format as described in FIGS. 2A, 2B, and 2C.

HS1 is comprised of an upper plate UP and a lower plate LP onto which, either LP or UP or both LP and UP, typical fins FT are fastened, forming typical air pathway AT, as further illustrated by FIG. 2C, in which FTs are substantially parallel, allowing AF to pass between.

FIG. 2A is a plan view sectional diagram of HS1 of heat sink comprised of a lower plate LP and an upper plate UP onto which typical fins F are attached and configured in a radial pattern allowing air flow AF to circulate within the area defined by FT, as further illustrated in FIG. 2B.

The heat sink of FIG. 2, HS3, is similar in construction and function to heat sink also of FIG. 2, HS2, differing in that typical fins FT do not extend through the center area of LP or UP, allowing AF to pass through the entire diameter of LP or UP; although LP and UP are shown to be round, any geometry can be adapted such as triangles, rectangles and other polygons are possible. Also, fin configurations can be can differ in length, can be curved, or can extend beyond the shape of the plates.

All heat sinks illustrated, HS1, HS2, and HS3, allow air flow to pass through LD allowing the space between the heat sinks to be sealed from moisture and other contaminates.

FIG. 3 is an isometric diagram of a partial view of a lighting device LD comprising a tubular structure ST and two heat sinks HS1 and HS2; onto which LED1 and LED2 are mounted respectively. The cooling fin elements FT of both HS1 and HS2 are located outside of ST allowing heat generated by LED1 and LED2 to be radiated and dissipated in free air, further allowing LD to be enclosed and or sealed. FT of HS1 are substantially parallel to each other and ST, while FT of HS2 radiate outward and are substantially 90° to ST, although FT can be at any angle to ST depending upon Luminaire Design Requirements. A typical module MT comprises LD is shown to contain HS1, LED1 and ST section SS1, although a more than one of the above mentioned components can comprise an MT. ST can comprise refracting elements as in FIG. 4. A wiring system connecting the LEDs comprising wires EW can be wrapped in spirals around the support tubes ST, be spiraled within the support tubes, or run substantially parallel to the tubes.

Figure 4:
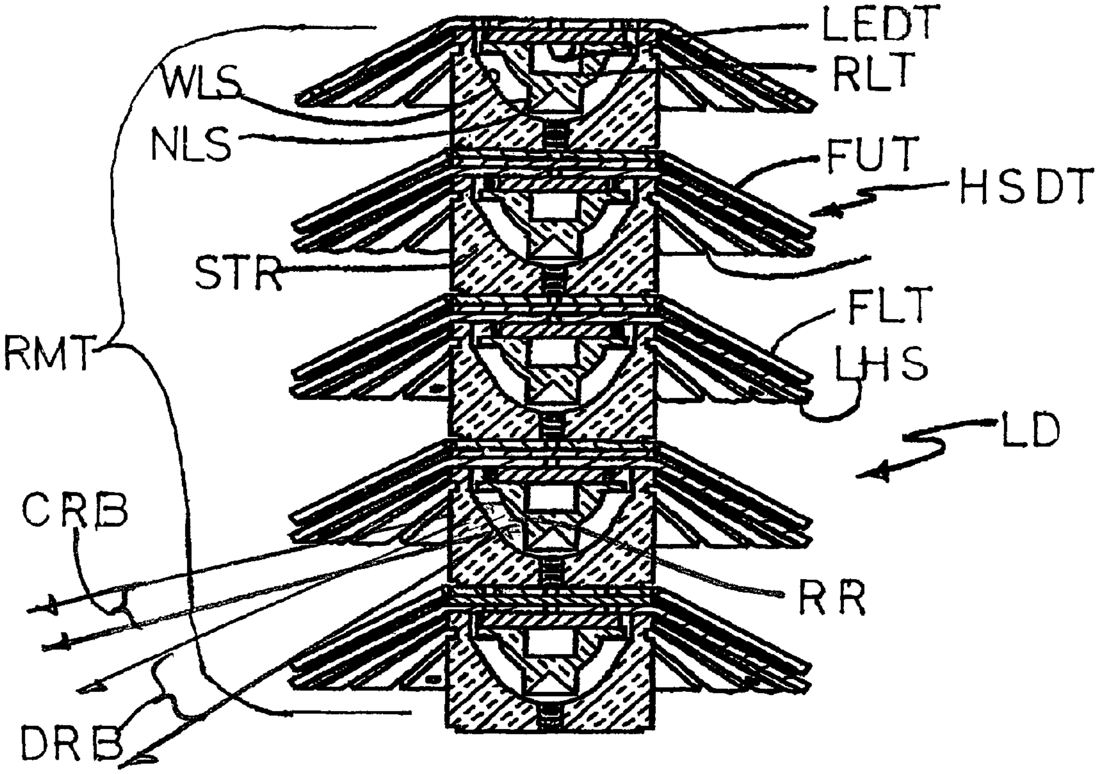
FIG. 4 is a cross-sectional view of a lighting device similar to that shown in FIG. 3.

FIG. 4 is a cross-sectional diagram of a lighting device LD similar to the lighting device as shown in FIG. 3, differing in that the typical LED [LEDT] in FIG. 4 is further surrounded by a radially collimating ring optic RLT, which is in turn further surrounded by structural tube member STR which comprises refracting elements namely a ring wedge lens section WLS which bends a portion of radial beam RR mainly from collimating ring optic RLT as canted beam CRB and negative lens section NLS which causes a portion of radial beam to diverge as diverging radial beam DRB. In some embodiments the radially collimating ring optic would not be required. Also, the lighting device LD of FIG. 4 differs from the lighting device in FIG. 3 in that heat sink HSDT of FIG. 4 comprises two congruent heat sinks that are a truncated cone in section and are radially offset from each other so that light radiating from typical LED LEDT passing through the space SP between typical heat sink fins FLT of the lower heat LHS is blocked by the typical fins FUT of the upper heat sink UHS. The LEDs LEDT, radially collimating ring optics RLT, structural tube members STR and heat sinks HSTS combine to form typical radial light projecting modules RMT. The functions of the modules are further explained in my U.S. Pat. No. 6,361,191B1 and my Co-Pending patent application Ser. No. 11/583,441, incorporated herein.

Figure 5:
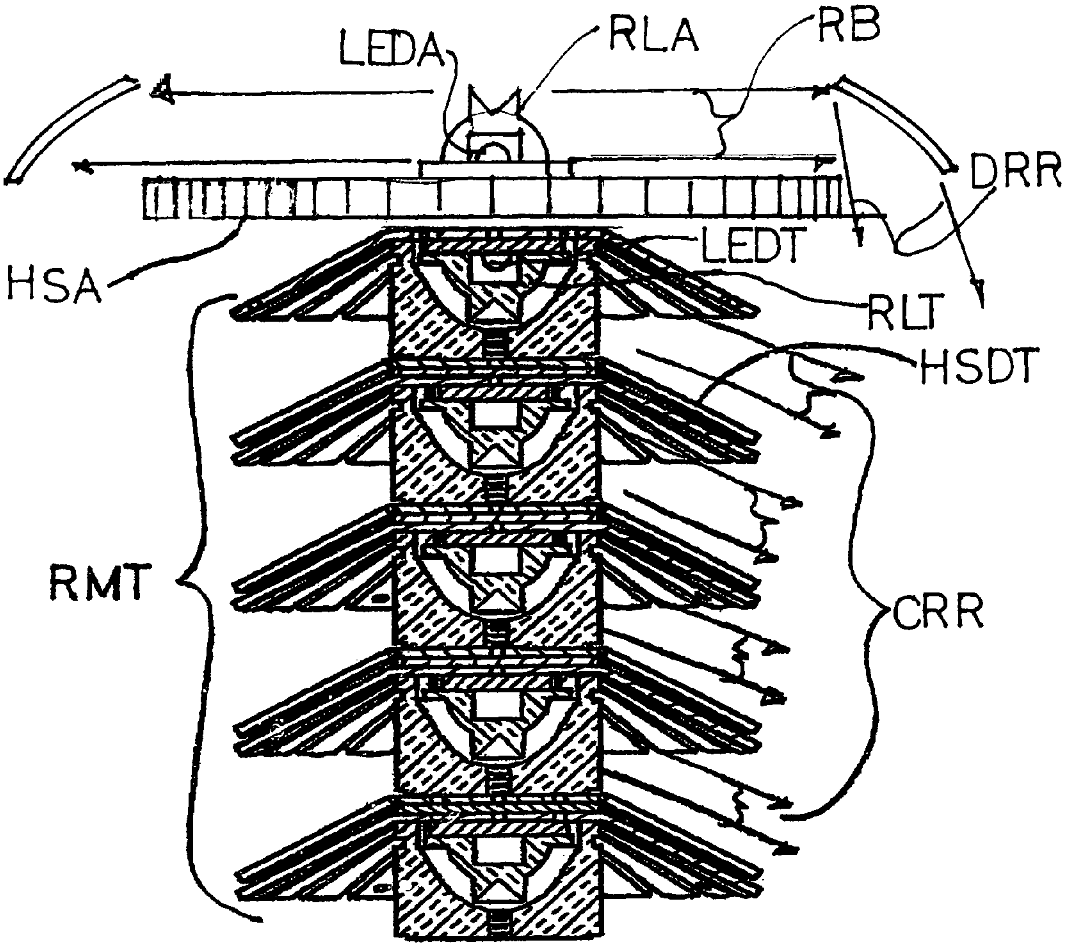
FIG. 5 is a cross-sectional diagram of a lighting device as in FIG. 4 with an additional heat sink configuration.

FIG. 5 is a cross-sectional diagram of a lighting device LD similar to the LD shown in FIG. 4, differing in that the LED is mounted to heat sink HSA which is substantially flat in section. Also, the optical component surrounding the LEDDA, namely the radially collimating ring optic projecting radial beam RB and reflector ring RR that redirects radial beam RR as a downward radial beam DRR, provides a different diameter light pattern from canted radial beam CPR as projected by RMT.

Figure 6:
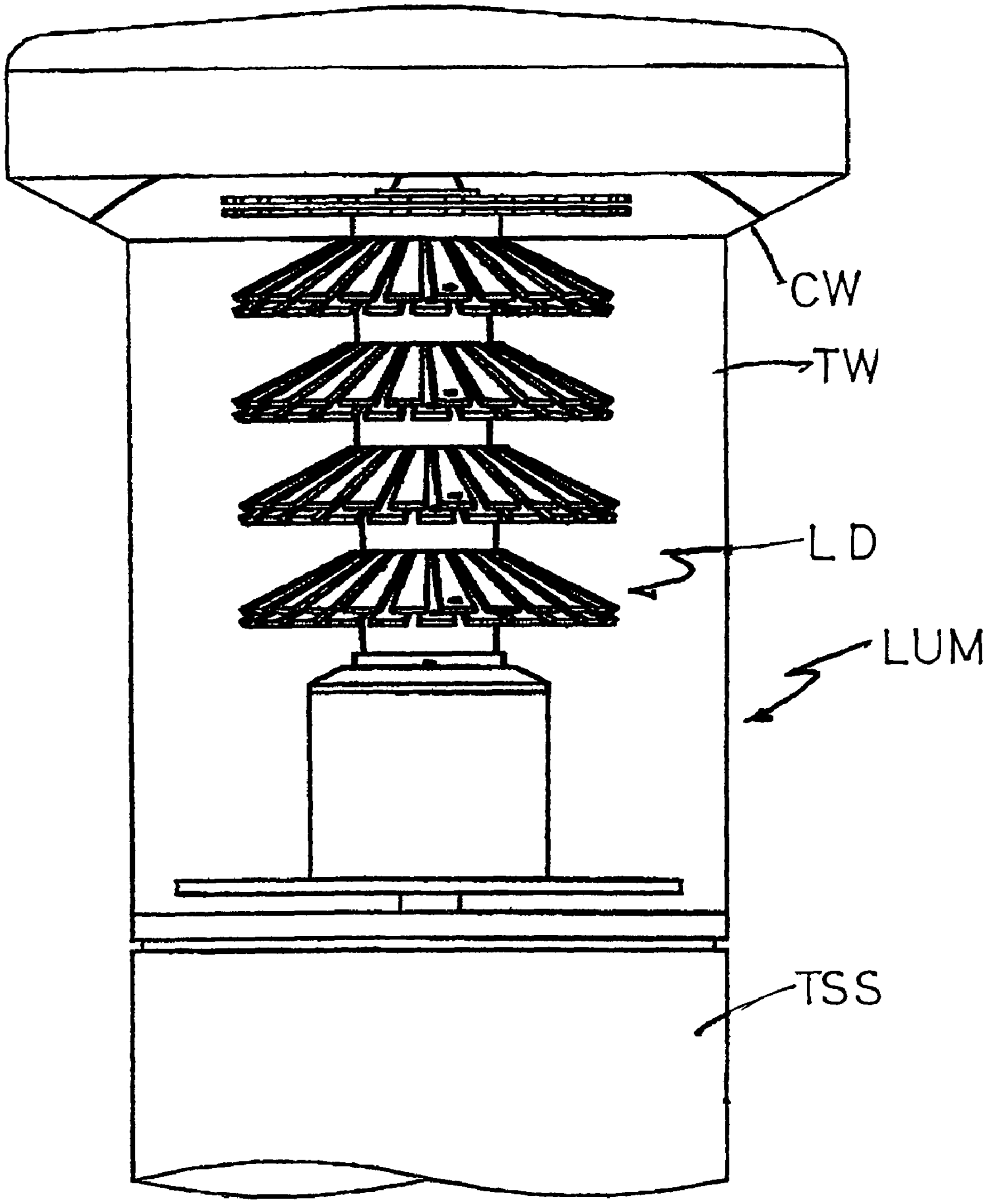
FIG. 6 is an elevation view of a luminaire similar to that shown in FIG. 5.

FIG. 6 is an elevation view of a luminaire LUM such as a bollard or a pathlight comprised of a light projecting device LD as described in FIG. 5, further comprising a conical lens CW through which rays DRR of FIG. 6 pass, a substantially clear tubular window TW, and a supporting structural tube TSS.

Figure 7:
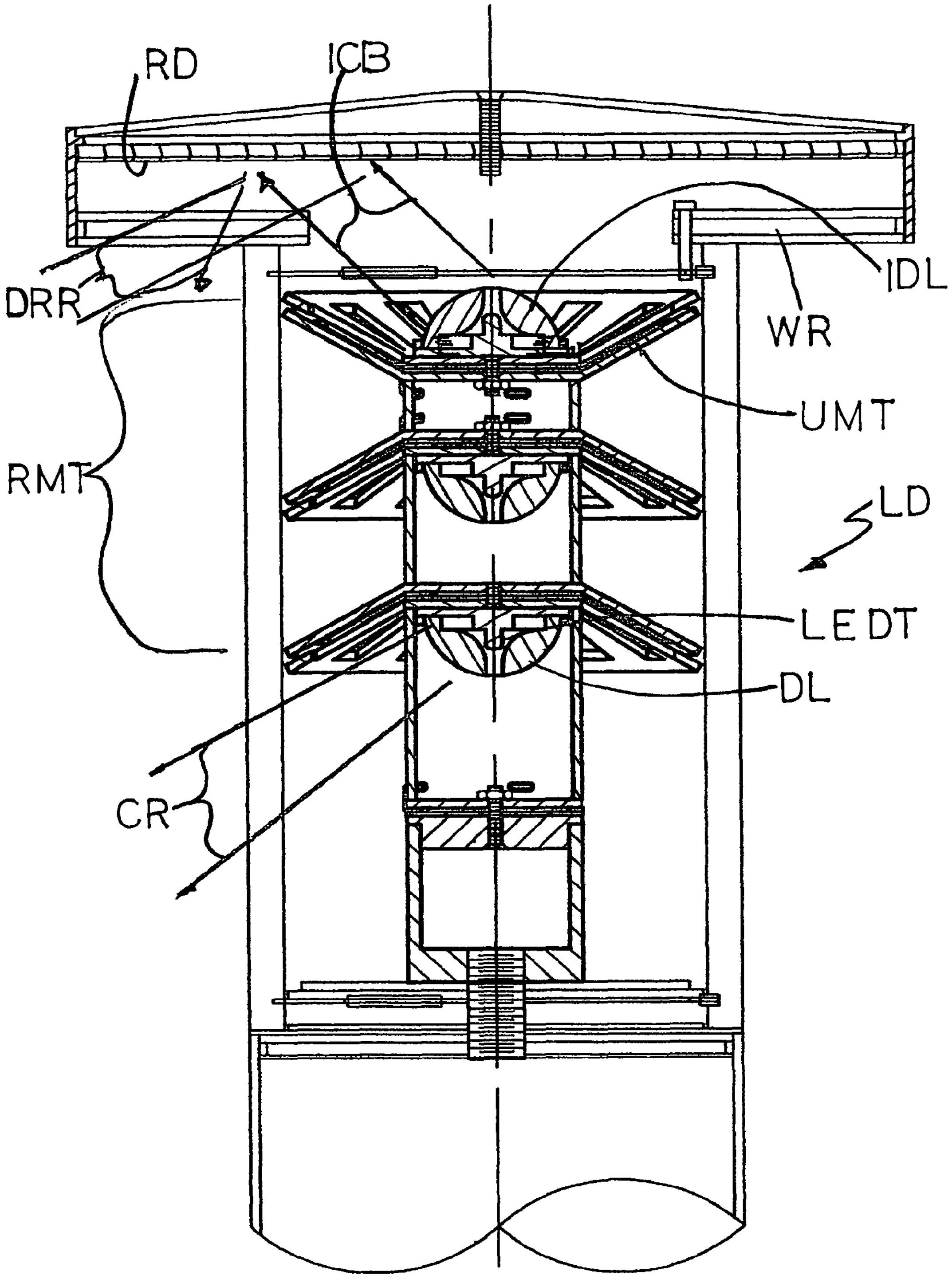
FIG. 7 is a cross-sectional view of a luminaire similar to that shown in FIG. 6.

FIG. 7 is a cross-sectional view off a luminaire LD similar to luminaire (lighting device) as illustrated in FIGS. 5 and 6, differing in that the optical component surrounding typical LEDs LEDT is a dome lens DL. Dome lens DL is further illustrated and described in FIG. 8. Dome lens DL is further surrounded by a substantially clear tube ST which structurally holds typical light projecting modules RMT together. Also, uppermost module UMT which is inverted dome lens IDL, projects inverted conical beam ICB onto, and is reflected by, reflector disk RD downward and through window ring WR, as conical radial beam DRR. As in FIG. 5, DRR provides light directly around the luminaire and within the light pattern, of projected canted radial beam CR projects by typical modules RMT.

Figure 8:
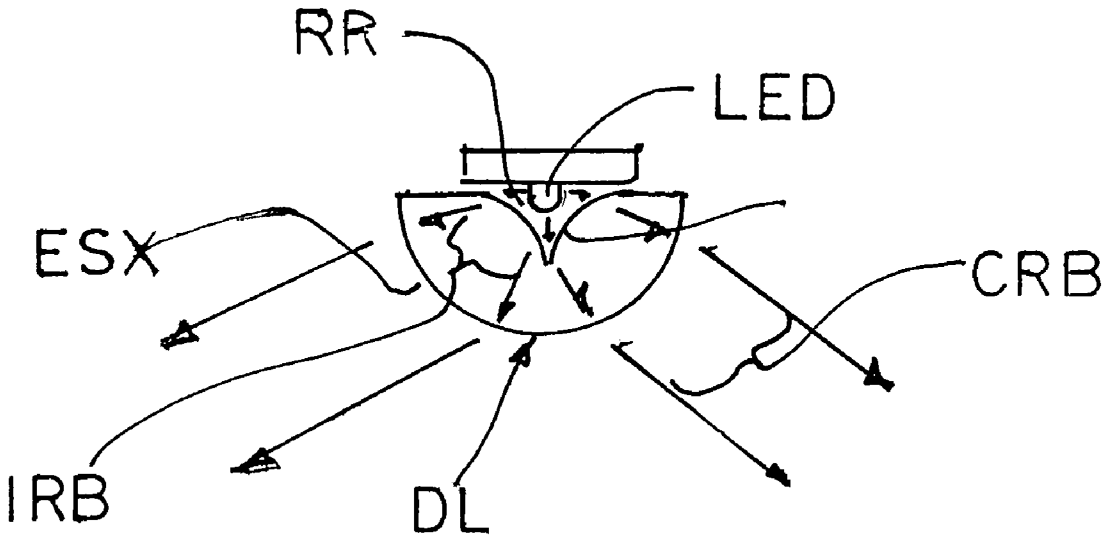
FIG. 8 is a cross-sectional view of a radially condensing dome lens.

FIG. 8 is a cross-sectional view of a light emitting diode LED surrounded by a radially light collecting, condensing, and radial beam projecting dome lens DL substantially shaped in the form of a dome. Dome lens DL has an inner rotated positive entry face ES which collects and condenses over radiant rays RR emanating from light emitting diode LED as internal radial beam IRB which is further condensed and projected by positive exit surface ESX as radial beam CRB.

The invention claimed is:

1. A luminaire module comprising:
at least two housings;
at least two heat sinks;
at least two LED modules sharing the same optical axis, each module including at least one LED, each mounted to a heat sink;
conductors for electrically connecting each module to a power source;
each module disposed within a housing, said housing being constructed of a material allowing for light from said LED to pass therethrough; and
said heat sink and housing being fabricated together in a manner as to allow convection around the heat sinks,
wherein at least one of the LEDs is further radially surrounded by an optical component,
the optical element including at least two subcomponents,
a first subcomponent forms a radially collimated beam away from the optical axis and a second subcomponent surrounding said first component is divided into a 1st and 2nd section, said 1st section bends a 1st portion of said radially collimated beam at an angle other than 90° to said optical axis and said 2nd section spreads a 2nd portion of said radially collimated beam as a beam diverging at an angle greater than the angle of divergence of said portion of said radially collimated beam.

2. A luminaire comprising:
at least two housings;
at least two heat sinks;
at least two LED modules sharing the same optical axis, each module including at least one LED, each mounted to a heat sink;
conductors for electrically connecting each module to a power source;
each module disposed within a housing, said housing being constructed of a material allowing for light from said LED to pass therethrough; and
said heat sink and housing being fabricated together in a manner as to allow convection around the heat sinks, wherein the heat sink includes hollow tubes, the openings of which lie on the outer surface of the housing, thereby allowing for the housings to be sealed and for convection to take place through the tubes.

3. A luminaire comprising:

at least two housings;

at least two heat sinks;

at least two LED modules sharing the same optical axis, each module including at least one LED, each mounted to a heat sink;

conductors for electrically connecting each module to a power source;

each module disposed within a housing, said housing being constructed of a material allowing for light from said LED to pass therethrough; and said heat sink and housing being fabricated together in a manner as to allow convection around the heat sinks, and wherein said heat sinks lie at the end and between said modules; said heat sinks including convection passageways between said housings, allowing for said housing to be sealed.

4. A lighting device comprising at least two light projecting modules surrounding a common optical axis, each module further comprising an LED, and a refracting optic surrounding at least one of said LEDs projecting a beam away from the optical axis: a heat sink onto which each of said LEDs is mounted; an electrical system at least comprising electrical conductors for supplying electrical continuity to each said LED; a housing at least partially constructed of material allowing light to pass through it, and enclosing the LED and said surrounding optic and providing structure and support to said heat sinks, all inner portion of said heat sink on which said LED is mounted is disposed and enclosed within said housing and an outer portion of said heat sink extends through the wall of the housing, said outer portion comprised of fins radiating outward from said optical axis.

* * * * *